United States Patent
Kawaguchi et al.

(10) Patent No.: US 11,416,610 B2
(45) Date of Patent: Aug. 16, 2022

(54) THREAT INFORMATION EVALUATION APPARATUS, THREAT INFORMATION EVALUATION METHOD AND PROGRAM

(71) Applicant: Nippon Telegraph and Telephone Corporation, Tokyo (JP)

(72) Inventors: Hidetoshi Kawaguchi, Tokyo (JP); Yuichi Ishihara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 26 days.

(21) Appl. No.: 17/041,589

(22) PCT Filed: Mar. 25, 2019

(86) PCT No.: PCT/JP2019/012498
§ 371 (c)(1),
(2) Date: Sep. 25, 2020

(87) PCT Pub. No.: WO2019/188975
PCT Pub. Date: Oct. 3, 2019

(65) Prior Publication Data
US 2021/0019405 A1    Jan. 21, 2021

(30) Foreign Application Priority Data
Mar. 27, 2018    (JP) ............... JP2018-060577

(51) Int. Cl.
*H04L 9/00*    (2022.01)
*G06F 21/56*    (2013.01)
*G06F 21/55*    (2013.01)

(52) U.S. Cl.
CPC .......... *G06F 21/561* (2013.01); *G06F 21/554* (2013.01); *G06F 2221/034* (2013.01)

(58) Field of Classification Search
CPC ...... G06F 21/50; G06F 21/561; G06F 21/554; G06F 2221/034; H04L 63/14
USPC ........................................................ 726/24
See application file for complete search history.

(56) References Cited

U.S. PATENT DOCUMENTS

| | | | | |
|---|---|---|---|---|
| 8,832,832 B1 * | 9/2014 | Visbal | ................ | H04L 63/1408 726/22 |
| 9,805,338 B1 * | 10/2017 | Ghosn | ................... | G06Q 30/08 |
| 2012/0232679 A1 * | 9/2012 | Abercrombie | ......... | G06Q 10/04 700/44 |

(Continued)

OTHER PUBLICATIONS

[No Author Listed], "Scikit-learn User Guide Release 0.23.1," Scikit-learn Developers, May 19, 2020, 2,751 pages.

(Continued)

*Primary Examiner* — Josnel Jeudy
(74) *Attorney, Agent, or Firm* — Fish & Richardson P.C.

(57) ABSTRACT

A threat information evaluation apparatus that evaluates threat information includes an allocation unit that allocates threat information in an input threat information list to a security operator or an evaluation unit, and an evaluation unit that evaluates the threat information allocated to the evaluation unit. The allocation unit calculates an estimation accuracy on the basis of evaluation performed by the evaluation unit and evaluation determined by the security operator, and allocates the threat information on the basis of the estimation accuracy.

12 Claims, 7 Drawing Sheets

(56) References Cited

U.S. PATENT DOCUMENTS

2021/0367962 A1* 11/2021 Kurowski .......... H04L 63/1433

OTHER PUBLICATIONS

Qiita.com, [online], "Hyperparameter Automatic Adjustment." Sep. 11, 2017, retrieved on Feb. 16. 2018, retrieved from URL<https://qiita.com/cvusk/items/1f3bl78f34c39beb29ff>. 33 pages (with English Translation).
Qiita.com, [online], "Learning Tips and Hyperparameter Guidelines for Deep Learning," Jan. 18, 2018, retrieved on Feb. 16, 2018, retrieved from URL<https://qiita.com/akimacb/items/88356ef46e98f045b035>, 20 pages (with English Translation).

* cited by examiner

Fig. 1

| ID | IP ADDRESS | PORT NUMBER | DESCRIPTION |
|---|---|---|---|
| 1 | 129.60.13.50 | 8080 | COMPUTER WILL STOP. |
| 2 | 129.60.13.51 | 9090 | IT IS AN ABNORMAL COMMUNICATION. |
| ... | ... | ... | ... |

Fig. 2

| ID | EVALUATION |
|---|---|
| 1 | IMPORTANT |
| 2 | UNIMPORTANT |
| ... | ... |

| | | EVALUATION PERFORMED BY EVALUATION MODULE | |
|---|---|---|---|
| | | IMPORTANT | UNIMPORTANT |
| ACTUAL EVALUATION (SECURITY OPERATOR) | IMPORTANT | 900 | 100 |
| | UNIMPORTANT | 200 | 800 |

THREAT INFORMATION EVALUATION APPARATUS, THREAT INFORMATION EVALUATION METHOD AND PROGRAM

CROSS-REFERENCE TO RELATED APPLICATIONS

This application is a National Stage application under 35 U.S.C. §371 of International Application No. PCT/JP2019/012498, having an International Filing Date of Mar. 25, 2019, which claims priority to Japanese Application Ser. No. 2018-060577, filed on Mar. 27, 2018. The disclosure of the prior application is considered part of the disclosure of this application, and is incorporated in its entirety into this application.

TECHNICAL FIELD

The present invention relates to a threat information evaluation apparatus, a threat information evaluation method, and a program, and to a technique which is applicable when a security operator handling a security system against a cyber-attack such as an Intrusion Prevention System (IPS) or anti-virus software evaluates threat information.

BACKGROUND ART

Threat information related cyber-attack activities including attackers, attackers' behavior, criminal techniques, vulnerabilities, and the like is generated every day. In order to determine whether threat information is important threat information and should be dealt urgently, a security operator needs to continually and sequentially evaluate threat information. Threat information and a security operator's evaluation for the threat information can be accumulated in a database and retrieved as necessary, but the evaluation of an enormous amount of threat information requires significant efforts by the security operator.

CITATION LIST

Non-Patent Literature

Non-Patent Literature 1: Scikit-learn user guide, Release 0.19.1, Internet <URL: http://scikit-learn.org/stable/_downloads/scikit-learn-docs.pdf>, retrieved Mar. 2, 2018 Non-Patent Literature 2: Various hyper parameter automatic adjustment, Internet <URL: https://qiita.com/cvusk/items/1f3b178f34c39beb29ff>, retrieved Mar. 2, 2018 Non-Patent Literature 3: Know-how of teaming in deep learning and guidelines for hyper parameter, Interne <URL: https://qiita.com/akimach/items/88356ef46e98f045b035>, retrieved Mar. 2, 2018

SUMMARY OF THE INVENTION

Technical Problem

As described above, a security operator needs to evaluate threat information, but there is a possibility that evaluation cannot be performed in a case where the amount of threat information itself becomes enormous. The inability to evaluate threat information may lead to a possibility that a cyber-attack cannot be prevented, which is undesirable for an organization that is an operation target.

In recent years, there have been attempts to extract patterns from enormous amounts of data and analyze, classify, and evaluate the patterns using a technique of machine learning. By using machine learning, pairs each including threat information serving as learning data and evaluation of the threat information are stored in a database, patterns are generated with an evaluation module, and the patterns can be mechanically evaluated (see NPL 1 to 3).

However, machine learning requires tuning for generating an appropriate pattern using an evaluation module, and a security operator needs to input results of evaluation of several pieces of threat information into the evaluation module as learning data. That is, the security operator needs to divide threat information into threat information to be evaluated by the security operator directly and threat information to be transmitted to the evaluation module. Transmission of all threat information to the evaluation module may lead to a risk of deterioration in the accuracy of evaluation of the evaluation module due to the obsolescence of patterns of the module, and thus allocation is essential. The allocation of threat information requires effort of a security operator. In addition, the threat information as an evaluation target is generated every day, and thus it is necessary to allocate threat information every time it is generated, which results in a problem that a significant amount of effort is required.

An object of the present invention is to reduce the required amount of effort of a security operator in performing allocation by automating the allocation of threat information.

Means for Solving the Problem

A threat information evaluation apparatus according to an aspect of the present invention is a threat information evaluation apparatus that evaluates threat information and includes an allocation unit that allocates threat information in an input threat information list to a security operator or an evaluation unit, and an evaluation unit that evaluates the threat information allocated to the evaluation unit, wherein the allocation unit calculates an estimation accuracy on the basis of evaluation performed by the evaluation unit and evaluation determined by the security operator, and allocates the threat information on the basis of the estimation accuracy.

A threat information evaluation method according to another aspect of the present invention is a threat information evaluation method executed by a threat information evaluation apparatus including an evaluation unit that evaluates threat information, and the method includes calculating an estimation accuracy on the basis of evaluation performed by the evaluation unit and evaluation determined by a security operator, inputting a threat information list, and allocating threat information in the input threat information list to the security operator or the evaluation unit on the basis of the estimation accuracy.

A program according to still another aspect of the present invention causes a computer to function as each unit of the above-described threat information evaluation apparatus.

Effects of the Invention

According to the present invention, it is possible to reduce the amount of effort required of a security operator in allocation by automating the allocation of threat information.

DESCRIPTION OF EMBODIMENTS

Hereinafter, an example of the present invention will be described with reference to the drawings.

Configuration of Threat Information Evaluation Apparatus

Figure 1:
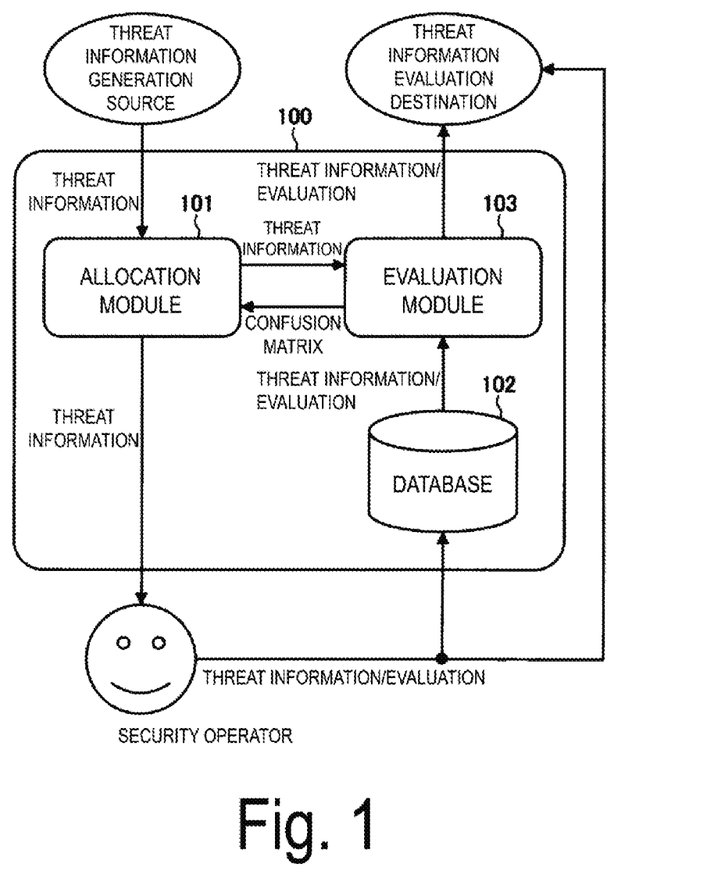
FIG. 1 is a diagram illustrating a functional configuration of a threat information evaluation apparatus according to an example of the present invention.

FIG. 1 is a diagram illustrating a functional configuration of a threat information evaluation apparatus according to an example of the present invention. A threat information evaluation apparatus 100 is an apparatus that evaluates threat information such as evaluating the importance of threat information. The threat information evaluation apparatus 100 includes an allocation module 101, a database 102, and an evaluation module 103.

The allocation module 101 is a processing unit that receives a threat information list as an input from a threat information generation source and allocates threat information in the threat information list to a security operator or the evaluation module 103. The threat information generation source is where threat information for the security operator is acquired, and is, for example, a vendor that develops IPS signatures or a platform that shares threat information.

Figure 2:
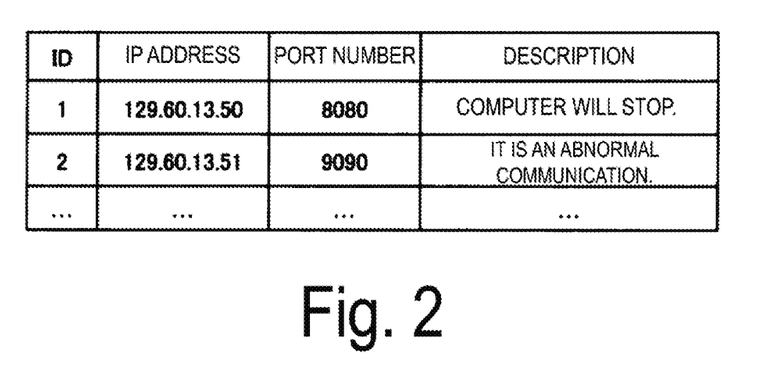
FIG. 2 is a diagram illustrating an example of threat information.

FIG. 2 is a diagram illustrating an example of threat information. Threat information includes information regarding a cyber-attack and includes content such as an ID which is an identifier of threat information, an IP address of a transmission destination/destination, a port number, and content of a cyber-attack.

The security operator is a person who receives threat information, performs the evaluation of the threat information, and provides the evaluation results to a threat information evaluation destination. The threat information evaluation destination is a destination to which a pair including threat information and the evaluation of the threat information is to be applied, and corresponds to, for example, an IPS itself in a case where threat information is a signature of the IPS.

Figure 3:
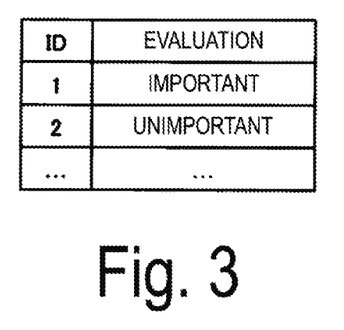
FIG. 3 is a diagram illustrating an example of evaluation of threat information.

FIG. 3 is a diagram illustrating an example of evaluation performed by a security operator or the evaluation module 103. The importance or the like is determined by the security operator or the evaluation module 103 for each piece of threat information illustrated in FIG. 2.

In a case where a pattern for performing evaluation is not sufficiently tuned in the evaluation module 103 such as an initial state, the allocation module 101 allocates threat information to the security operator. On the other hand, in a case where a pattern for performing evaluation is sufficiently tuned in the evaluation module 103, the allocation module 101 can allocate threat information to the evaluation module 103, but allocates a portion of the threat information to the security operator to prevent the obsolescence of the pattern.

The database 102 is a storage medium that stores threat information and evaluation performed by the security operator in association with each other. Information stored in the database 102 is used to derive a pattern for performing evaluation and the accuracy of the evaluation.

The evaluation module 103 is a processing unit that evaluates threat information allocated to the evaluation module 103. The evaluation module 103 can generate a pattern for performing evaluation by machine learning or the like. For example, the evaluation module 103 generates a pattern on the basis of pairs each including threat information stored in the database 102 and evaluation performed by the security operator, and evaluates received threat information using the pattern. In addition, data used to calculate the performance of a pattern for performing evaluation for the allocation module 101, for example, a confusion matrix, is also transmitted.

The allocation module 101 calculates an estimation accuracy on the basis of evaluation performed by the evaluation module 103 and evaluation determined by the security operator, and performs allocation on the basis of the estimation accuracy. For example, the allocation module 101 receives a confusion matrix of evaluation from the evaluation module 103, calculates an estimation accuracy on the basis of the confusion matrix, and divides the threat information into the threat information to be transmitted to the security operator and the threat information to be transmitted to the evaluation module 103 based on the estimation accuracy. threat information transmitted to the evaluation module 103 can be automatically evaluated, thereby increasing the effect. On the other hand, when the transmission of threat information to the evaluation module 103 is excessively performed, the accuracy of evaluation of the evaluation module 103 may deteriorate. For this reason, it is also necessary to appropriately transmit threat information to the security operator in order to adjust parameters of the evaluation module 103.

Processing in Evaluation Module

Next, a specific example of processing in the evaluation module 103 will be described with reference to FIG. 4.

The evaluation module 103 receives threat information allocated by the allocation module 101 (S101) and receives the security operator's evaluation from the database 102 (S102).

The evaluation module 103 can generate a pattern for performing evaluation using a method of tuning hyper parameters of machine learning with data (S103). In addition, threat information is evaluated using the generated pattern.

The evaluation module 103 generates a confusion matrix on the basis of evaluation performed by the evaluation module and evaluation determined by the security operator (S104).

Figure 5:
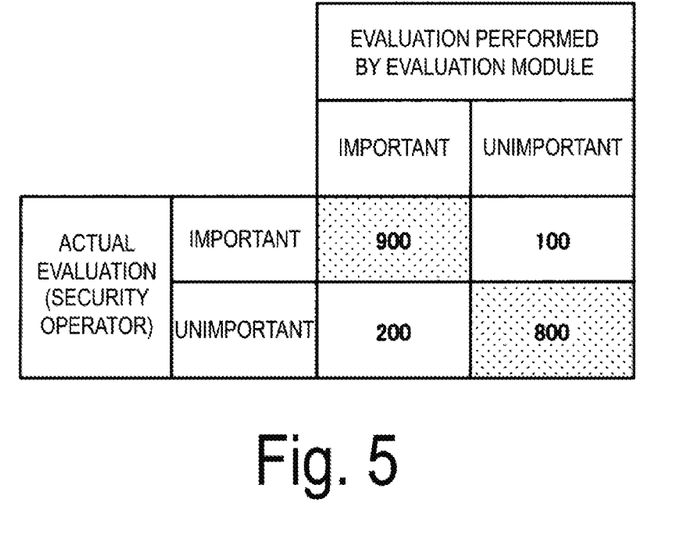
FIG. 5 is a diagram illustrating an example of a confusion matrix.

FIG. 5 is a diagram illustrating an example of a confusion matrix. A confusion matrix a matrix used for evaluating the performance of a classifier or a model of machine learning. There are several quantitative indexes for measuring performance, but a generally used index can be calculated from elements of the confusion matrix. Hereinafter, a specific example will be described in which there are two types of evaluations of "important" and "unimportant," a total number of pieces of threat information is 2000, the number of pieces of threat information assumed to be actually "important" by a security operator is 1000, and the number of pieces of threat information assumed to be "unimportant" is 1000. In the example of FIG. 5, the evaluation module 103 evaluated 900 pieces of threat information, which actually should be 1000 pieces, as "important" and evaluated 800 pieces of threat information as "unimportant." That is, 900+800 corresponds to the number of cases correctly evaluated, and 100+200 corresponds to the number of cases incorrectly evaluated.

Note that a confusion matrix can be generalized n-dimensionally. An n-dimensional confusion matrix A will be described below.

$$A = \begin{bmatrix} a_{1,1} & \cdots & a_{1,j} & \cdots & a_{1,n} \\ \vdots & \ddots & \vdots & \ddots & \vdots \\ a_{i,1} & \cdots & a_{i,j} & \cdots & a_{i,n} \\ \vdots & \ddots & \vdots & \ddots & \vdots \\ a_{n,1} & \cdots & a_{n,j} & \cdots & a_{n,n} \end{bmatrix}$$ [Formula 1]

Here, i and j are IDs indicating evaluation. In addition, n is the number of types of evaluation. For example, when there are types of evaluation such as "important," "unimportant," and "moderate," n=3, and a confusion matrix can be expressed as a matrix of 3×3. In addition, $a_{i,j}$ represents the number of pieces of threat information evaluated to be i by the security operator and to be j by the evaluation module 103. For example, $a_{1,1}$, and $a_{2,2}$, satisfying i=j correspond to the number of cases actually correctly evaluated.

The confusion matrix of FIG. 5 can be expressed as follows.

$$A = \begin{bmatrix} 900 & 100 \\ 200 & 800 \end{bmatrix}$$ [Formula 2]

The confusion matrix A is transmitted to the allocation module 101 for processing in the allocation module 101.

Processing in Allocation Module

Next, a specific example of processing in the allocation module 101 will be described with reference to FIG. 6.

The allocation module 101 receives a threat information list from a threat information generation source (S201) and receives a confusion matrix A from the evaluation module 103 (S202). Note that it is assumed that the confusion matrix A is generated for a threat information list prior to the threat information list received in step S201.

The allocation module 101 calculates an estimation accuracy α on the basis of the confusion matrix a (S203). A method of calculating the estimation accuracy α essentially needs to be set in consideration of a situation of a security operator, or the like, but a simple specific example will be described below. The estimation accuracy α indicates a percentage of correct answers in the evaluation of all threat information, and can be obtained by the sum of diagonal components with respect to the sum of all components of an n-dimensional confusion matrix.

$$\alpha = \frac{\sum_{i=1}^{n} a_{i,i}}{\sum_{i=1}^{n} \sum_{j=1}^{n} a_{i,j}}$$ [Formula 3]

Figure 4:
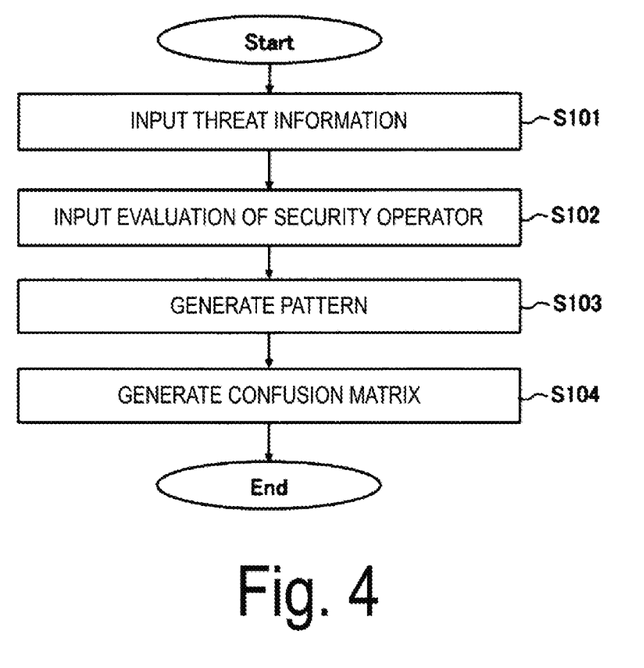
FIG. 4 is a flowchart illustrating processing in an evaluation module.

In the example of FIG. 4, the estimation accuracy α is calculated as follows.

$$\alpha = \frac{900 + 800}{900 + 100 + 200 + 800} = 0.85$$ [Formula 4]

The allocation module 101 compares the estimation accuracy α with a threshold value β (S204). In a case where α>β, γ pieces of threat information in a threat information list are allocated to the security operator, and the rest of the threat information is allocated to the evaluation module 103 (S205). Here, β and γ are parameters which are set in advance. Note that γ pieces of threat information may be allocated to both the security operator and the evaluation module 103.

In a case where α≤β, all of the threat information in the threat information list is allocated to the security operator (S206).

Figure 6:
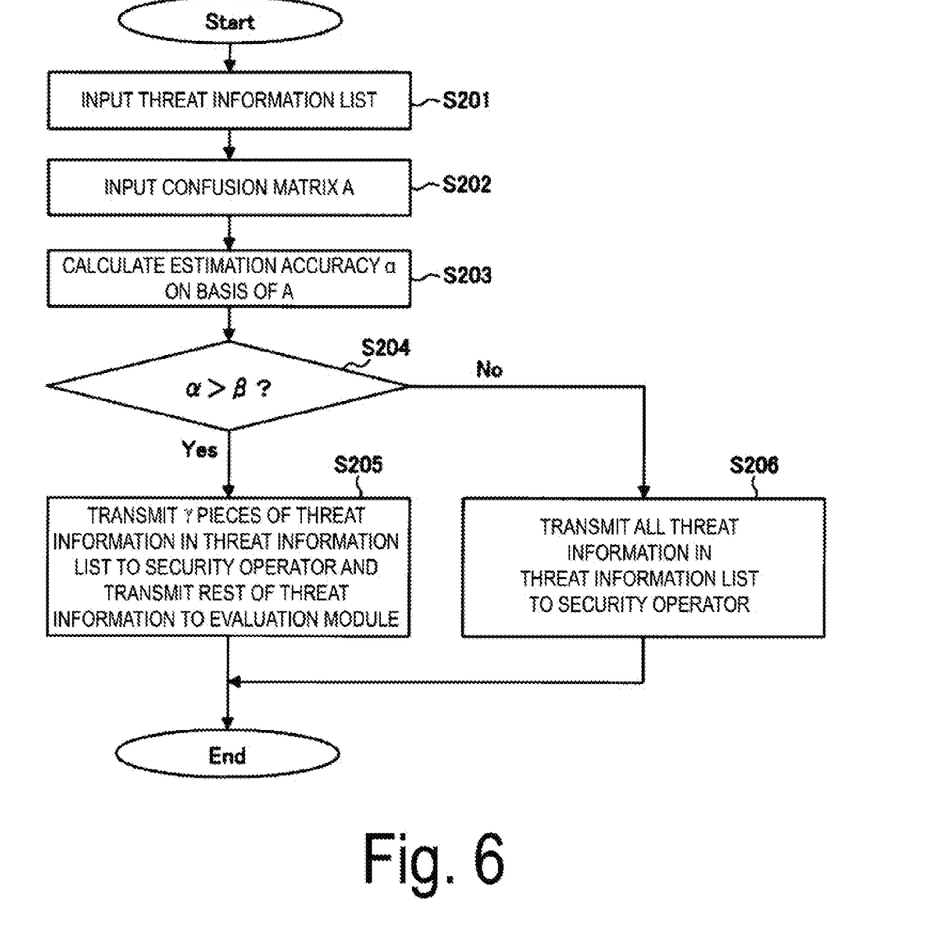
FIG. 6 is a flowchart illustrating processing in an allocation module.

Note that, although the estimation accuracy α and the threshold value β are compared with each other and γ pieces of threat information in the threat information list are allocated to the security operator in step S205 of FIG. 6, it is also possible to determine the number of pieces of threat information to be allocated to the security operator by setting a plurality of threshold values. Further, in order to increase the number of pieces of threat information to be allocated to the security operator as the estimation accuracy α decreases, for example, an allocation ratio may be calculated on the basis of the estimation accuracy α, and it may be determined whether to allocate threat information to the security operator or allocate threat information to the evaluation module 103 on the basis of the allocation ratio.

Effects of Example of Present Invention

In the evaluation of threat information in the related art, the allocation module 101 is not provided. Thus, a security operator needs to receive all threat information from a threat information generation source and perform determination regarding allocation directly. The estimation accuracy of the evaluation module 103 at the present time, or the like is required to be applied to allocation, and thus a non-negligible amount of effort is required.

On the other hand, in the threat information evaluation apparatus of the example of the present invention, the allocation module 101 can allocate threat information when a security operator receives threat information from a vendor providing an IPS or acquires threat information from the Internet. In a case where the estimation accuracy does not exceed the threshold value, all of the threat information is allocated to the security operator. This corresponds to a case where a sufficient amount of data is not available for pattern generation, such as an initial state. A security operator evaluates each piece of threat information, and a pair including threat information and the evaluation of the threat information is transmitted to a threat information evaluation destination. At the same time, the pair including the threat information and the evaluation thereof is copied to the database 102 to be used for pattern generation of the evaluation module 103.

When the estimation accuracy α exceeds the threshold value β, γ pieces of threat information are allocated to the security operator, and the rest of the threat information is allocated to the evaluation module 103. The evaluation module 103 evaluates the threat information in accordance with a pattern. The security operator also evaluates the received threat information, transmits a pair including the threat information and the evaluation of the threat information to a threat information evaluation destination, and copies the pair to the database 102. In this case, threat information evaluated by the security operator is only a portion of the entirety, and thus the effort of the security operator is reduced.

In addition, automation of a pattern of the evaluation module 103 is automatically determined, and it is possible to dynamically switch whether the security operator evaluates all threat information or the security operator evaluates only a portion.

In this manner, it is possible to automate the allocation of threat information in consideration of the performance of patterns generated by machine learning or the like. As a result, the effort of the security operator for performing allocation is eliminated, and thus the effort related to evaluation is reduced.

Example of Hardware Configuration

Figure 7:
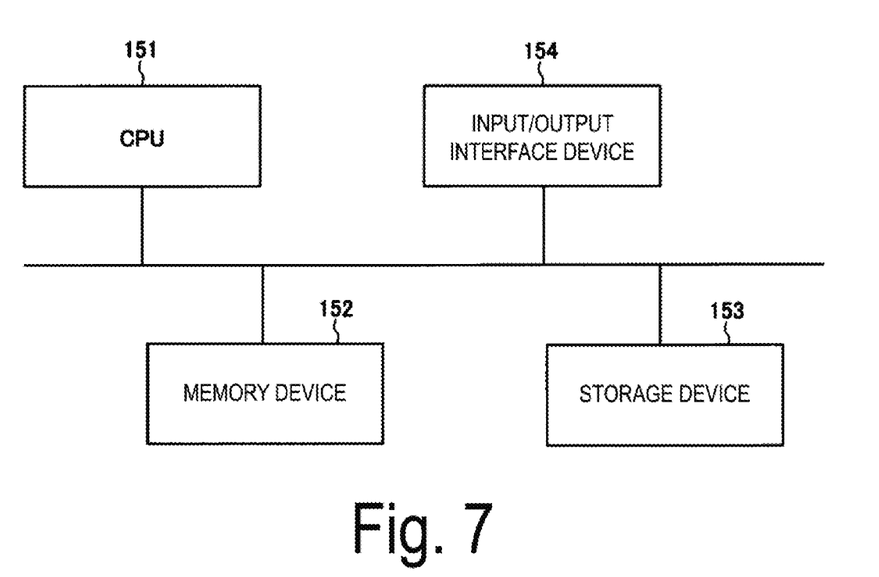
FIG. 7 is a diagram illustrating a hardware configuration example of a threat information evaluation apparatus.

FIG. 7 illustrates a hardware configuration example of the threat information evaluation apparatus 100 according to the example of the present invention. The threat information evaluation apparatus 100 may be a computer including a processor such as a central processing unit (CPU) 151, a memory device 152 such as a random access memory (RAM) or a read only memory (ROM), a storage device 153 such as a hard disk, an input and output interface device 154, and the like. For example, functions and processing of the threat information evaluation apparatus 100 are achieved by the CPU 151 executing data or a program stored in the storage device 153 or the memory device 152. In addition, the input of data to the threat information evaluation apparatus 100 may be performed using the input and output interface device 154, and the output of data from the threat information evaluation apparatus 100 may be performed using the input and output interface device 154.

Supplements

Although the threat information evaluation apparatus according to the example of the present invention has been described using the functional block diagrams for convenience of description, the threat information evaluation apparatus according to examples of the present invention may be realized by hardware, software, or a combination thereof. For example, examples of the present invention may be realized by a program for causing a computer to realize the functions of the threat information evaluation apparatus according to examples of the present invention, a program for causing a computer to execute each procedure of the method according to examples of the present invention, or the like. Further, respective functional units may be used in combination, as necessary. Further, the method according to the example of the present invention may be performed in an order different from the order shown in the example.

While a method for reducing the effort of a security operator for allocating threat information by automating the allocation of threat information has been described, the present invention is not limited to the above-described example, and various changes and applications can be made within the scope of the claims.

Reference Signs List

100 THREAT INFORMATION EVALUATION APPARATUS
101 ALLOCATION MODULE
102 DATABASE
103 EVALUATION MODULE
151 CPU
152 MEMORY DEVICE
153 STORAGE DEVICE
154 INPUT and OUTPUT INTERFACE DEVICE

The invention claimed is:

1. A threat information evaluation apparatus that evaluates threat information, the threat information evaluation apparatus comprising:
a memory device storing computer-readable instructions; and
a processor configured to execute the computer-readable instructions to:
evaluate threat information allocated thereto; and
calculate an estimation accuracy based on an evaluation performed by an evaluation module of the threat information evaluation apparatus and an evaluation determined by a security operator, and allocate threat information in a threat information list to the security operator or the evaluation module based on the estimation accuracy.

2. The threat information evaluation apparatus according to claim 1, wherein the processor is configured to:
generate a confusion matrix based on the evaluation performed by the evaluation module and the evaluation determined by the security operator, and
calculate the estimation accuracy based on the confusion matrix.

3. The threat information evaluation apparatus according to claim 2, wherein the processor is configured to:
generate an n-dimensional confusion matrix representing a relationship between the evaluation performed by the evaluation module and the evaluation determined by the security operator, and
calculate a sum of diagonal components with respect to a sum of all components of the n-dimensional confusion matrix as the estimation accuracy.

4. The threat information evaluation apparatus according to claim 1, wherein the processor is configured to allocate some of the threat information in the threat information list to the security operator in a case where the estimation accuracy is larger than a threshold value, and allocate all of the threat information in the threat information list to the security operator in a case where the estimation accuracy is less than or equal to the threshold value.

5. A threat information evaluation method executed by a threat information evaluation apparatus including a processor, the method comprising:
calculating an estimation accuracy based on an evaluation performed by an evaluation module of the threat information evaluation apparatus and an evaluation determined by a security operator;
receiving a threat information list; and
allocating threat information in the threat information list to the security operator or the evaluation module based on the estimation accuracy.

6. A non-transitory computer readable medium storing instructions that when executed by a computer cause the computer to perform a threat information evaluation method comprising:
    calculating an estimation accuracy based on an evaluation performed by an evaluation module of the computer and an evaluation determined by a security operator;
    receiving a threat information list; and
    allocating threat information in the threat information list to the security operator or the evaluation module based on the estimation accuracy.

7. The threat information evaluation method according to claim 5, wherein calculating the estimation accuracy based on the evaluation performed by the evaluation module and the evaluation determined by the security operator comprises:
    calculating the estimation accuracy based on a confusion matrix generated by the evaluation module based on the evaluation performed by the evaluation module and the evaluation determined by the security operator.

8. The threat information evaluation method according to claim 7, wherein calculating the estimation accuracy based on the confusion matrix comprises:
    calculating a sum of diagonal components with respect to a sum of all components of an n-dimensional confusion matrix generated by the evaluation module, the n-dimensional confusion matrix representing a relationship between the evaluation performed by the evaluation module and the evaluation determined by the security operator.

9. The threat information evaluation method according to claim 5, wherein allocating threat information in the threat information list to the security operator or the evaluation module based on the estimation accuracy comprises:
    allocating some of the threat information in the threat information list to the security operator in a case where the estimation accuracy is larger than a threshold value; and
    allocating all of the threat information in the threat information list to the security operator in a case where the estimation accuracy is less than or equal to the threshold value.

10. The non-transitory computer readable medium according to claim 6, wherein calculating the estimation accuracy based on the evaluation performed by the evaluation unit and the evaluation determined by the security operator comprises:
    calculating the estimation accuracy based on a confusion matrix generated by the evaluation module based on the evaluation performed by the evaluation module and the evaluation determined by the security operator.

11. The non-transitory computer readable medium according to claim 10, wherein calculating the estimation accuracy based on the confusion matrix comprises:
    calculating a sum of diagonal components with respect to a sum of all components of an n-dimensional confusion matrix generated by the evaluation module, the n-dimensional confusion matrix representing a relationship between the evaluation performed by the evaluation module and the evaluation determined by the security operator.

12. The non-transitory computer readable medium according to claim 6, wherein allocating threat information in the threat information list to the security operator or the evaluation module based on the estimation accuracy comprises:
    allocating some of the threat information in the threat information list to the security operator in a case where the estimation accuracy is larger than a threshold value; and
    allocating all of the threat information in the threat information list to the security operator in a case where the estimation accuracy is less than or equal to the threshold value.

\* \* \* \* \*